UNITED STATES PATENT OFFICE.

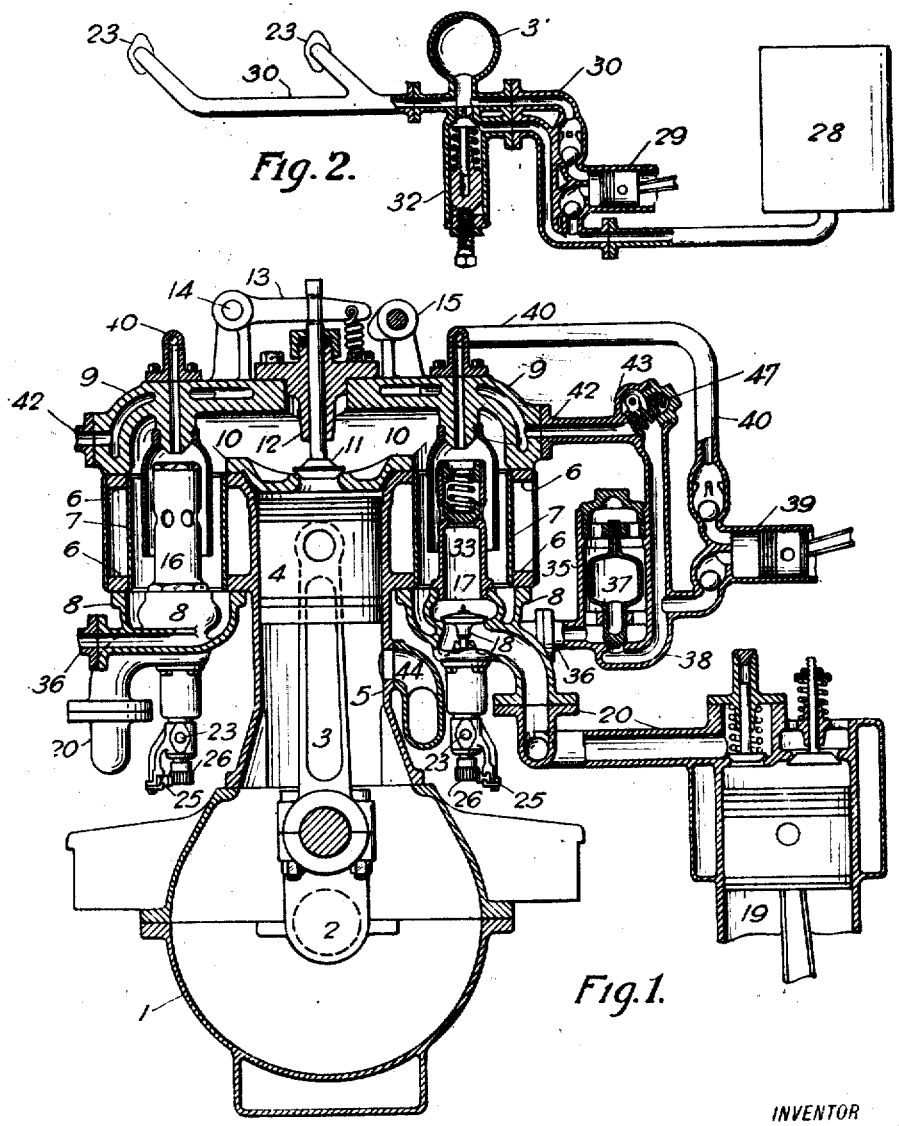

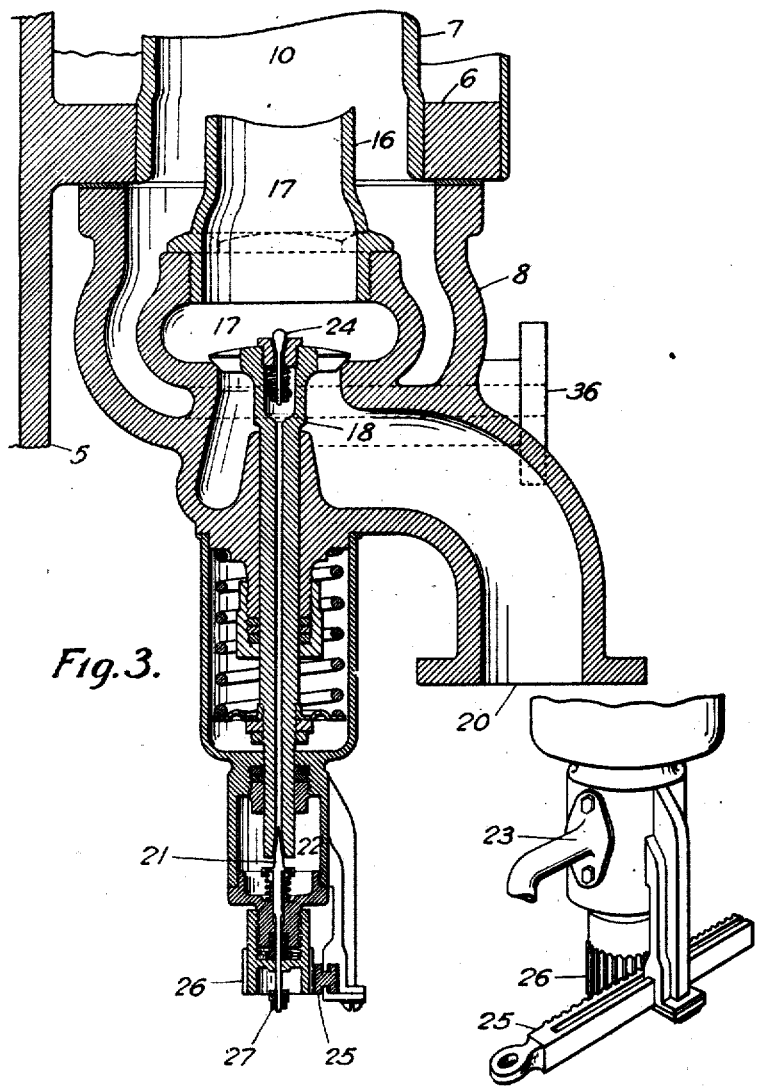

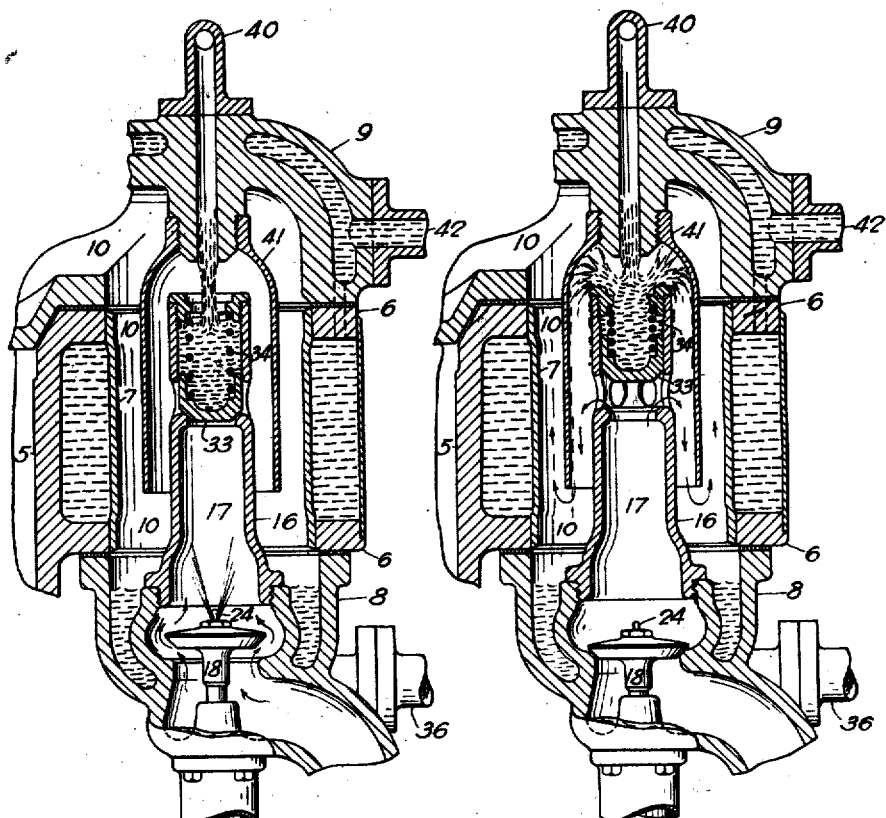

HARVEY B. BLACK, OF BOGOTA, NEW JERSEY.

INTERNAL-COMBUSTION ENGINE.

1,322,523.  Specification of Letters Patent.  Patented Nov. 25, 1919.

Application filed June 4, 1917. Serial No. 172,828.

*To all whom it may concern:*

Be it known that I, HARVEY B. BLACK, a citizen of the United States, residing at Bogota, in the county of Bergen and State of New Jersey, have invented certain new and useful Improvements in Internal-Combustion Engines, of which the following is a full, true, and complete specification.

My invention is an improvement in internal combustion engines. By having the combustion take place in a cylinder separate from either the compression or working cylinders I am able to cool the gases of combustion sufficiently to permit their use in a working cylinder without cooling said working cylinder, and in so cooling these gases I heat the cooling water or liquid to a high enough temperature to generate steam which is used for power in a working cylinder together with the gases of combustion. By this process I have virtually an internal combustion engine wherein air is compressed in a cylinder and with liquid fuel is forced into a separate combustion cylinder and exploded, after which the gases are cooled by a water injection which comes in direct contact with the gases of combustion, turning a portion of this cooling water into steam. This cool gas and generated steam is confined in such manner as to permit its use in a working cylinder. In the manner described I am able to save most of the heat loss of an internal combustion engine due to the cooling of the explosion chamber.

I attain these objects by the mechanism illustrated in the accompanying drawings in which:

Figure 1 is a vertical cross section of the working cylinder and combustion chamber together with air compression cylinder and water circulating and injection pump laid out diagrammatically and connected thereto.

Fig. 2 shows a diagrammatical sectional view of the fuel injection pump and its component parts.

Fig. 3 shows a sectional view of the air inlet valve in combustion cylinder base with a fuel injection device and fuel regulating mechanism.

Fig. 4 is a view in perspective of rack and gear for fuel regulating device.

Figs. 5 and 6 show in section combustion tube, hood, combustion cylinder base and a portion of the pressure chamber and illustrate the method of injecting water for the purpose of cooling the hood, combustion chamber and the gases of combustion and for generating steam.

Fig. 7 is a plan view of the assembly of the parts separately shown in Figs. 1 and 2, showing the interconnection of the motor unit and its driven auxiliaries, parts being broken away to show underlying parts in section.

Similar numerals refer to similar parts throughout the several views.

Crankcase 1 contains crankshaft 2 driven by connecting rod 3 from piston 4 reciprocating in power cylinder 5. I call cylinder 5 the power cylinder because all pressure generated in the engine is used in this cylinder for the development of power. In order to make the engine as light as possible and at the same time strong enough to withstand high pressures I have designed power cylinder 5 with flanges 6—6 into which tubes 7—7 are expanded. These tubes 7—7 are closed off at the bottom by base and air valve container 8 bolted to flanges 6—6 and are connected at top by cap piece 9. Though one combustion tube and chamber of proper size would be sufficient to obtain the desired results I prefer to have two, one on each side of power cylinder 5, as I believe two make a smoother running engine and give it better balance. These tubes 7—7 together with bases 8—8 and cap piece 9 form a pressure chamber 10 in which all pressure due to expansion of the gases of combustion and any pressure due to the evaporation of the cooling water into steam, as hereinafter described, are held in check to be used in the power cylinder 5. These pressure gases are admitted to power cylinder 5 at the proper time and stroke of piston 4 by the operation of valve 11 held in place by valve guide 12 bolted to cap piece 9. Valve 11 is operated by a cross arm 13 working on pivot 14 which is lifted by cam 15. Piston 4 being at top of stroke, cam 15 lifts cross arm 13 which lifts valve 11 and admits pressure into cylinder 5, forcing piston 4 down in cylinder 5, turning crankshaft 2 and developing power. Gases are exhausted at bottom of stroke of piston 4 through exhaust port 44.

Base 8 forming bottom of pressure chamber 10 also acts as a base for combustion tube 16 and together with combustion tube 16 forms combustion chamber 17. Considering that the pressure of the gases of combustion, remaining in combustion chamber 17 after the explosion, have been sufficiently reduced by the cooling of combustion tube 16, as hereinafter described, air valve 18 will open admitting a fresh supply of compressed air into combustion chamber 17 from the air compression cylinder 19 through air connection 20. Air compression cylinder 19 may be of any approved form and could be directly connected to crank shaft 2. Air valve 18 has a hollow stem in the end of which is seated needle valve 21 and inclosing this needle valve 21 is a fuel chamber 22 containing fuel under pressure with fuel connection at 23. When air valve 18 lifts to admit air to combustion chamber 17 it will cause the seat in the end of the valve stem to draw away from the needle valve 21, admitting a portion of the fuel contained in fuel chamber 22 to the hollow in the stem of valve 18, forcing the fuel already in the stem out through check valve 24 into combustion chamber 17.

Adjustment of the quantity of this fuel injection is obtained by the use of a rack 25 rotating a gear 26 causing it to move up or down on the screw thread shown as part of this gear 26 on a fixed screw thread which is part of fuel chamber casing. Needle valve 21 has a nut 27 on the lower end of its stem for the purpose of checking the upward movement of this valve 21 when valve 18 opens. If gear 26 is all the way up on its screw thread needle valve 21 will follow valve 18 its full lift and valve 21 will not leave its seat. If gear 26 is rotated by rack 25 in such manner as to lower gear 26 on its screw thread nut 27 will stop needle valve 21 from making a full lift with valve 18, thereby drawing valve 21 from its seat, allowing a portion of the fuel to pass into stem of valve 18. Thus it will be seen that any movement of rack 25 will give an adjustment of the fuel charge into combustion chamber 17.

If it is desirable to use a very volatile fuel, the air and fuel can be mixed in the carbureter before entering the compression cylinder 19, necessitating the use of an igniting device in combustion chamber 17 to insure ignition of this mixture. In such case the fuel injection device I have shown is eliminated, but otherwise the construction and principle of operation remain the same.

All valves work in guides and are held to their seats by springs.

I have noted that there is fuel under pressure in chamber 22. This fuel is drawn from storage tank 28 by fuel pump 29 and delivered into pipe line 30 running to connections 23. On line 30 I have placed an air dome 31 for the purpose of counteracting any fluctuations in pressure and assuring a steady pressure on the fuel, also a relief valve 32 to keep the pressure constant and relieve the pressure when the amount of fuel used in engine is reduced.

To make clear my arrangement for cooling the gases of combustion I have shown two sections of combustion chamber comprising combustion tube 16 and base 8, Figs. 5 and 6. In Fig. 5 valve 18 is open, admitting a fresh supply of air into combustion chamber 17 as indicated by arrows. As before described, the opening of valve 18 permits an injection of fuel to be delivered through check valve 24 into combustion chamber 17, and since the air admitted to chamber 17 is of a high enough pressure and temperature to ignite the fuel injected an explosion will occur, causing a high pressure in combustion chamber 17. This high pressure will close air valve 18 and check valve 24 and the gases will find an outlet through valve 33, at top of combustion tube 16, into pressure chamber 10 as indicated by the arrows in Fig. 6. Valve 33 is held to its seat by spring 34 which causes this valve to close immediately after the outrush of gases from combustion chamber 17, thus isolating the gases remaining in combustion chamber 17.

It is the idea of my invention to cool any gases of combustion remaining in combustion chamber 17 after the explosion and by thus reducing their temperature reduce their pressure below the pressure of the compressed air back of valve 18. This will allow a fresh supply of air and fuel to be injected into combustion chamber 17, causing an explosion, and as this process is continuous I will have the explosions in combustion chamber 17 intermittent.

The following description of the cooling system refers to Fig. 1 where the system is laid out diagrammatically and Figs. 5 and 6 where the combustion chamber 17 is shown in more detail. A constant quantity of water is contained in base 8, shown by the broken lines, and is regulated by means of a float regulating valve 35 which is connected to base 8 by pipe 36. Valve 35 contains a combination float and valve 37. When the water level in base 8 is sufficiently high float and valve 37 rises allowing water to be drawn from base 8 through pipes 36 and 38 into pump 39, which delivers it through pipe 40 and cap piece 9 into pressure chamber 10 onto top of combustion tube 16. The top of combustion tube 16 and valve 33 are so constructed as to form a cup shaped receptacle which holds a quantity of water at all times, insuring adequate cooling of valve 33 and spring 34. When an explosion occurs in combustion chamber 17 valve 33 rises, forcing a portion of the water above said valve out of the top of combustion tube 16. Attached to cap piece 9 I have provided a hood 41 which extends down around combustion tube 16. This hood 41 causes the gases of combustion leaving combustion chamber 17 to be deflected downward between the inside of the walls of hood 41 and the outside of combustion tube 16 around the bottom of hood 41 and up between the outside of said hood 41 and inside of tube 7. This circulation of the gases causes a considerable amount of heat to be taken up by hood 41. When valve 33 opens, causing an overflow of the water contained above said valve in tube 16, a portion of this water runs down the outside of tube 16 and the remainder will be partially ejected in a shower against hood 41 and into the space between said hood and combustion tube 16. This ejected water spray, coming in contact with hood 41, which has been heated by the hot gases of combustion, will be partially evaporated into steam. Thus I have a process for cooling the gases contained in tube 16 and an effective method of partially cooling the gases outside of tube 16 in pressure chamber 10 and as the water comes into direct contact with the hot gases of combustion I have a very effective steam generator. The gases of combustion and the steam generated will form a mixture of a temperature suitable for use in a cylinder for the efficient development of power. As a portion of this cooling water is used up in the generating of steam the quantity in the circulating system will diminish I have provided means for using the jacket water surrounding pressure chamber 10 which has been heated by the conduction of heat through the metal inclosing pressure chamber 10. I have provided a connection to this jacket water at 42 which connects to a check valve 43, which is normally held upon its seat by the spring 47. When the water in base 8 gets low enough to lower float 37 in valve 35 the flow of water will be shut off from base 8 and the suction of pump 39 will draw water from the jacket through check valve 43 and deliver it into pipe 40 onto combustion tube 16 as before described until water level in base 8 returns to its normal level.

It will be obvious to those skilled in the art that my improvements may be embodied either in an engine having a single compression or power cylinder and a combustion or explosion chamber or chambers associated therewith, or that they may be embodied in an engine having a plurality of compression or power cylinders without change of principle or departure from the spirit of my invention.

Inasmuch as I have invented an internal combustion engine in which I am able to employ a combustion and explosion chamber separate from the compression or power cylinders and have provided means for cooling this combustion or explosion chamber in such manner as to cool the gases of combustion to a suitable working temperature, and in said process of cooling I am able to generate steam under pressure and use the resultant mixture of combustion gases and steam for the development of power, thereby conserving the energy which would be lost by the cooling of the engine by any external application of the cooling element.

I claim:

1. In an internal combustion engine, the combination of a fuel-injecting device and an air-injecting device adapted jointly to supply an explosive mixture under pressure to a combustion chamber, a water-injecting device adapted to supply water under pressure against the exterior of said combustion chamber for cooling said chamber and the gases of combustion produced, a hood surrounding said chamber adapted to coöperate therewith in converting the cooling water into steam, and a pressure chamber, partially surrounding said hood and combustion chamber and in communication therewith, adapted to receive said gases and the steam generated from said water.

2. In an internal combustion engine, the combination of a liquid fuel supply, means adapted to feed fuel therefrom under pressure to a combustion chamber, means adapted to feed air under pressure to said combustion chamber, means adapted to feed water under pressure upon said combustion chamber, a hood surrounding said chamber adapted to coöperate therewith in converting the cooling water into steam, a pressure chamber having a portion surrounding said hood and combustion chamber and adapted to receive the gases produced by said combustion and the steam generated from the water so fed, a power cylinder opening into said pressure chamber and having a member therein adapted to be actuated by the expansion of said mixture of gases and steam, and separately to actuate said several feed means.

3. In an internal combustion engine, the combination of means adapted to supply liquid fuel, air and water separately each under pressure, a combustion chamber adapted to receive the said fuel and air so supplied to it and to promote the combustion thereof, a hood surrounding said chamber adapted to coöperate therewith in converting the water into steam, a pressure chamber having a portion surrounding said combustion chamber and adapted to receive therefrom the gases produced by combustion, together with steam generated by said combustion chamber from the water so supplied to the pressure chamber, and a power cylinder communicating with said pressure chamber and having a member therein adapted to be actuated by the expansion of said mixture of gases and steam.

4. In an internal combustion engine, the combination of a combustion chamber, a pressure chamber surrounding same, a water jacket surrounding both, and means for circulating water through said jacket and said pressure chamber comprising a pump adapted to inject water upon said combustion chamber and to withdraw water from said pressure chamber, means for supplying water to said water jacket, and means for withdrawal of water therefrom when the water in the pressure chamber falls below a predetermined level.

5. In an internal combustion engine, the combination of a combustion chamber, a pressure chamber surrounding same, a water jacket surrounding both, and means for circulating water intermittently through said jacket and continuously through said pressure chamber comprising a pump adapted to inject water upon said combustion chamber and to withdraw water from said pressure chamber, means for supplying water to said water jacket, and means for withdrawal of water therefrom when the water in the pressure chamber falls below a predetermined level.

6. In an internal combustion engine, the combination of an air compressor, a fuel-injecting device, means adapted to supply an explosive mixture therefrom to a combustion chamber, a pressure chamber communicating with and surrounding said combustion chamber, an inlet valve adapted to admit said mixture to said combustion chamber and adapted to check any effective back pressure therefrom, an outlet valve from said combustion chamber to said pressure chamber adapted to prevent any reaction of the gases from said pressure chamber, and a water-circulating means for cooling said combustion chamber comprising a water injector adapted to supply water upon the exterior walls of said combustion chamber, means adapted to withdraw water from the bottom of said pressure chamber and to deliver it at the top thereof under pressure.

7. In an internal combustion engine, the combination of an air compressor, a fuel-injecting device, means adapted to supply an explosive mixture therefrom to a plurality of combustion chambers, a pressure chamber communicating with and surrounding said combustion chambers, inlet valves adapted to admit said mixture to said combustion chambers and adapted to check any effective back pressure therefrom, outlet valves from said combustion chambers to said pressure chamber adapted to prevent any reaction of the gases from said pressure chamber, and a water-circulating means for cooling said combustion chambers comprising a water injector adapted to supply water upon the exterior walls of said combustion chambers, means adapted to withdraw water from the bottom of said pressure chamber and to deliver it at the top thereof under pressure.

8. In an internal combustion engine, the combination of a combustion chamber, a pressure chamber surrounding same, a water jacket surrounding both, and means for circulating water through said jacket and said pressure chamber comprising a pump adapted to inject water upon said combustion chamber and to withdraw water from said pressure chamber, means for supplying water to said water jacket, and means for withdrawal of water therefrom when the water in the pressure chamber falls below a predetermined level, and a regulating device adapted to predetermine said level.

9. In an internal combustion engine, the combination of a combustion chamber, a pressure chamber surrounding same, a water jacket surrounding both, and means for circulating water through said jacket and said pressure chamber comprising a pump adapted to inject water upon said combustion chamber and to withdraw water from said pressure chamber, and means for maintaining the supply of water in said pressure chamber substantially constant.

10. In an internal combustion engine, a centrally disposed working cylinder, a pressure chamber exterior thereto and surrounding the end thereof, and a plurality of combustion chambers symmetrically disposed with relation to said cylinder and inclosed within said pressure chamber.

11. In an internal combustion engine, a centrally disposed working cylinder, a pressure chamber exterior thereto and surrounding the end thereof, a plurality of combustion chambers, symmetrically disposed with relation to said cylinder and inclosed within said pressure chamber, and separate means of supply of air and liquid fuel adapted to feed a carbureted mixture under pressure to each said chambers.

12. In an internal combustion engine, a centrally disposed working cylinder, a pressure chamber exterior thereto and surrounding the end thereof, a plurality of combustion chambers symmetrically disposed with relation to said cylinder and inclosed within said pressure chamber, separate means of supply of air and liquid fuel adapted to feed a carbureted mixture under pressure to each said chambers, and a water-circulating device adapted to supply water directly upon said combustion chambers and to said pressure chamber for cooling the gases of combustion and for generation of steam therein.

13. In an internal combustion engine, the combination of an air compression unit adapted to coöperate with a liquid fuel feed unit to form a carbureted mixture in a combustion chamber, a water-circulating unit adapted to cool said combustion chamber, and a power-developing unit adapted to be operated indirectly from said combustion chamber and to operate said air, fuel and water units, said liquid fuel feed unit comprising a pump and fuel-injection valve and an air dome and pressure regulating valve upon the line between said pump and injector.

14. In an internal combustion engine, a combustion chamber having an inlet port and an injection valve seated therein, an outlet port in alinement therewith normally closed during combustion and adapted to be opened by the gases of combustion, and a reservoir associated with said valve adapted to discharge water therefrom when said valve is opened.

15. In an internal combustion engine, a combustion chamber having an inlet port at the base thereof adapted to admit air under compression, a valve seating in said port and adapted to open said port under the pressure of said air and to close under the pressure of the gases of combustion, said valve having a tubular stem adapted to admit liquid fuel under compression, a valve within the head of the port-closing valve adapted to be opened by the pressure of fuel and also adapted to be closed by the pressure of gases of combustion, an outlet port at the top of said combustion chamber, a valve adapted to seat therein under spring pressure greater than the sum of the pressures of said air and fuel, and to be unseated by the pressure of the gases of combustion, said valve having a cupped head traveling in a cylindrical guide, said head and guide constituting a reservoir adapted to be filled by water injected thereinto, ports in said guide adapted to be uncovered by the lifting of said valve, the upward travel of said valve being adapted substantially to empty said reservoir and to permit the gases of combustion to escape through said ports and to become mixed with steam resulting from the contact of said water with the walls of said combustion chamber.

16. In an internal combustion engine, a combustion chamber having an inlet port at the base thereof adapted to admit air under compression, a valve seating in said port and adapted to open said port under the pressure of said air and to close under the pressure of the gases of combustion, said valve having a tubular stem adapted to admit liquid fuel under compression, a valve within the head of the port-closing valve adapted to be opened by the pressure of fuel and also adapted to be closed by the pressure of gases of combustion, an outlet port at the top of said combustion chamber, a valve adapted to seat therein under spring pressure greater than the sum of the pressures of said air and fuel, and to be unseated by the pressure of the gases of combustion, said valve having a cupped head traveling in a cylindrical guide, said head and guide constituting a reservoir adapted to be filled by water injected thereinto, ports in said guide adapted to be uncovered by the lifting of said valve, the upward travel of said valve being adapted substantially to empty said reservoir and to permit the gases of combustion to escape through said ports and to become mixed with steam resulting from the contact of said water with the walls of said combustion chamber, and an inverted bell partially inclosing said combustion chamber and adapted to coöperate in converting water into steam and to direct any surplus water downwardly toward the base of said chamber.

17. In an internal combustion engine, a combination of an air compression cylinder and a liquid fuel pump delivering air and liquid fuel under pressure into a combustion chamber, said combustion chamber having an inlet valve for air with a fuel valve so connected therewith as to admit an injection of fuel when the air inlet valve opens to admit air to said combustion chamber, together with a device for regulating this fuel valve to control the amount of the injection of the liquid fuel charge, and an outlet valve from said combustion chamber so arranged as to open and allow the escape of the gases of combustion into an inclosed space surrounding said combustion chamber, with a device for cooling these gases of combustion by a water injection, said water injection process consisting of a circulating system wherein water is drawn off from the bottom of the combustion tube inclosure and delivered in at the top onto said combustion chamber by means of a pump, and a regulating device for controlling the supply of water to the pump from the bottom of the combustion tube inclosure, and a means of drawing water from the jacket surrounding the combustion tube inclosure and delivering said water to pump to be injected into said combustion chamber inclosure, thereby keeping an almost constant quantity of water in the combustion cylinder, with a continuous circulation of same and a uniform, steady, cooling arrangement, and the utilization of the pressure thus formed by the combustion of the air and liquid fuel and the water or other liquid vaporized in the process of cooling, in the development of power.

18. The combination, in an internal combustion engine, of an air compression unit and fuel injecting device to force air and fuel under pressure into a combustion or explosion chamber, said combustion chamber being inclosed in a vessel in such manner as to provide a pressure-chamber enveloping said combustion chamber, said combustion chamber having inlet valves for the admission of air and fuel to said chamber, and an outlet valve into said pressure chamber from said combustion chamber, the inlet valves so constructed as to check any pressure, due to explosion, from reacting on air or fuel pressures, and the outlet valve so constructed as to permit the escape of gases from the combustion chamber into surrounding pressure chamber and prevent the gases in said pressure chamber from reacting on the gases contained in combustion chamber, with a water circulating device for cooling the combustion chamber, said circulating device consisting of a water injection in a circulating system wherein water is drawn off from the bottom of the combustion tube inclosure and delivered in at top onto said combustion chamber by means of a pump, and a regulating device for controlling the supply of water to the pump from the bottom of the combustion tube inclosure, and a means of drawing from the jacket surrounding the combustion tube inclosure and delivering said water to pump to be injected into said combustion cylinder inclosure, thereby keeping an almost constant quantiy of water in the combustion cylinder, with a continuous circulation of same and a uniform, steady, cooling arrangement, said cooling device also cooling the gases of combustion contained in said pressure chamber and generating steam by direct contact of the water with the gases of combustion, said gases of combustion and steam under pressure being used for the development of power in a power unit, all in the manner described.

HARVEY B. BLACK.